June 13, 1933. W. J. MILLER 1,913,501

INSTALLATION FOR THE MANUFACTURE OF GLASSWARE

Filed July 26, 1929   2 Sheets-Sheet 1

William J. Miller
INVENTOR.

BY William H. Young
ATTORNEY

June 13, 1933.   W. J. MILLER   1,913,501
INSTALLATION FOR THE MANUFACTURE OF GLASSWARE
Filed July 26, 1929   2 Sheets-Sheet 2

William J. Miller.
INVENTOR.
BY William H. Young
ATTORNEY

Patented June 13, 1933

1,913,501

UNITED STATES PATENT OFFICE

WILLIAM J. MILLER, OF SWISSVALE, PENNSYLVANIA, ASSIGNOR TO WILLIAM J. MILLER INC., A CORPORATION OF DELAWARE

INSTALLATION FOR THE MANUFACTURE OF GLASSWARE

Application filed July 26, 1929. Serial No. 381,107.

This invention relates to glass fabricating installations of the kind comprising a machine for feeding charges of glass to a machine for fabricating said charges into ware. In such installations is is required to synchronize the feeding machine with the fabricating machine, that is to maintain such a timed relationship of their actions that the glass charges are fed or released by the feeding machine at the instant that the proper molds or other charge receiving means of the fabricating machine occupy the desired position relatively to the feeding point, or under the feeding orifice. It is usual for the two machines to be separable whereby a feeding machine for example can serve different fabricating machines. A common arrangement is for the feeder machine to be stationary on a molten glass tank, and the fabricating machine to be mounted on a wheeled truck. When the fabricating machine has to be brought into working relationship with the feeder machine, the synchronizing of their actions is an operation that has heretofore been accompanied by considerable difficulty, requiring skill and judgment on the part of the operator.

An object of the present invention is to enable a glass feeder machine and a fabricating machine to be readily synchronized even by unskilled operators.

Another object of the invention is to enable the said machines to be operatively coupled together in proper synchronism without shock.

Another object of the invention is to permit the machines to be coupled to a common drive in accordance with indications of the relative phases of their operation.

Another object of the invention is to permit the charge feed to be variably timed relatively to the movement of the charge receiving device with respect to the feeding point.

Another object of the invention is to provide visible means for ascertaining at any time the advance or retardation of the charge receiving means of the fabricating machine with respect to the feeding point.

Another object of the invention is to permit speeding up and synchronizing the fabricating machine with the feeder machine without interrupting the continuity of operation of the latter.

A further object is to provide a single means for effecting such variable timing of the charge feed and for coupling the machines for operation by a common driving motor.

According to the present invention the installation comprises a single driving means geared to one of the machines, an indicator moving in phase with the charge feeding action of the feeder machine, a second indicator moving in phase with the operation of the fabricating machine and preferably concentrically with respect to the first indicator, and a friction or yielding clutch of the kind the members whereof can engage in any angular position relatively to each other, for coupling the other machine to the driving means. An attendant, by watching the indicators, can synchronize the machines by engaging the clutch members at, or near, the instant the two indicators are co-incident, the setting of the indicators being such that when they are co-incident or in some predetermined relationship to each other, the charge receiving device of the fabricating machine will be in the desired relationship to the feeder outlet, and the charge delivery mechanism will be in action. By suitable manipulation of the clutch the attendant can gradually speed up the fabricating machine and finally close the clutch when it is at operative speed and in step with the feeding machine, as shown by the indicators. With this arrangement, moreover, the timing of the charge delivery relatively to the movement of the charge receiving device with respect to the feeding orifice can be varied by manipulation of the clutch without the need of a separate timing adjustment for this sole purpose.

The closing of the clutch may also be effected automatically in dependence on the coincidence of the indicators instead of by hand.

In order that the invention may be fully understood there will now be described by way of example, and illustrated in the accompanying drawings a glass fabricating installation embodying the invention. In these drawings.

The synchronizing and driving mechanism according to this invention is herein illustrated as applied to a glass feeder machine of the well-known Hartford-Empire type, associated with a glass fabricating machine of the intermittently rotating table type as described for example in Patent No. 1,700,326 for making glass bottles and other articles.

It will be understood that the fabricating machine comprises a number of press molds with or without blow or other finishing molds mounted on an intermittently rotatable support, the blank molds passing and dwelling under the feeding point where they receive mold charges or gathers of molten glass from the feeding machine to be worked up into a glass bottle or other article in the various fabricating devices of the machine.

Figure 1:
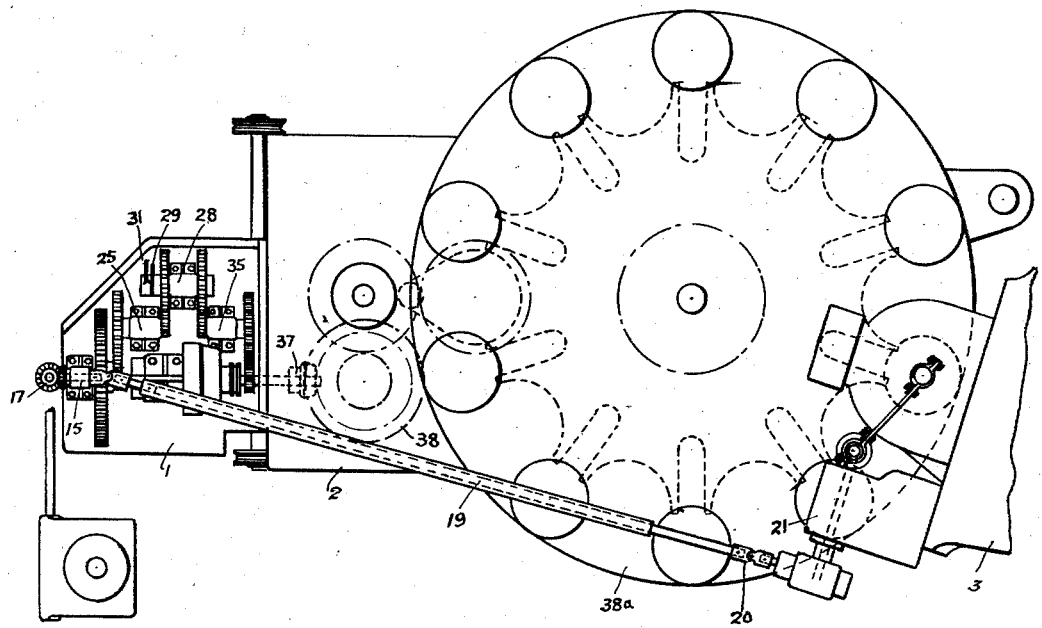
Figure 1 is a general view showing in plan the driving and synchronizing mechanism according to the invention connected to a charge feeder machine and a glass fabricating machine.
Figure 2:
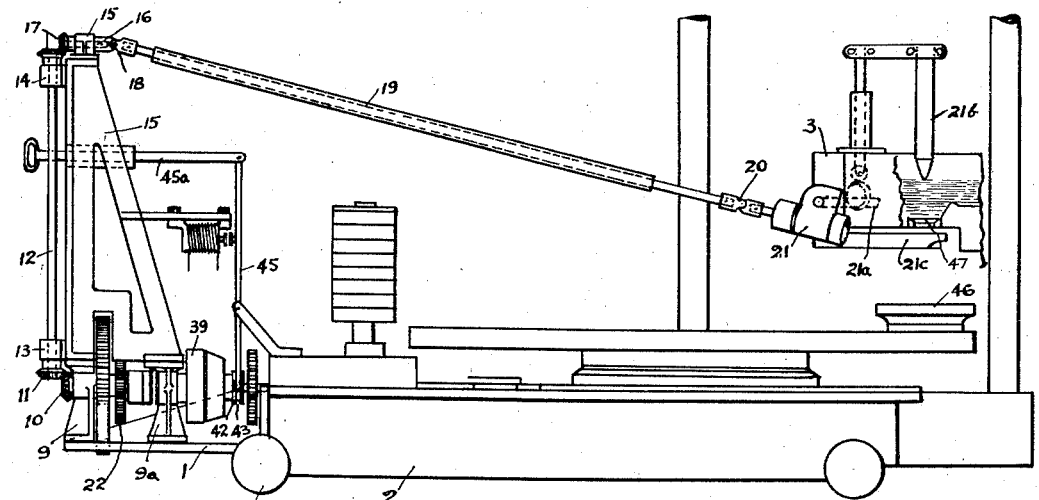
Fig. 2 is an elevation of the installation shown in Fig. 1.

The synchronizing and driving mechanism is shown in Figs. 1 and 2 as mounted on a cast base 1 bolted to the base of the fabricating machine 2, which latter to enable it to be approached to and removed from the feeder machine 3, is mounted on a wheeled truck 4. The fabricating machine is located between the feeder machine and the said mechanism, the base 1 overhanging at one end of the truck. An electric motor 5 is bolted on the base 1, and its driving pinion 6 engages a large spur wheel 7 keyed on a shaft 8 journalled in brackets 9, 9a, on the base. The shaft 8 extends beyond the outside bracket 9 and carries on the projecting stub a bevel pinion 10, engaging a bevel wheel 11 keyed on a vertical shaft 12. The shaft 12 is journalled in lower and upper brackets 13, 14 bolted to a rigid standard 15 which in turn is bolted to the tops of the brackets 9, 9a. The top of the standard 15 carries a bearing bracket in which is journalled a stubshaft 16 geared by bevel gears 17 to the vertical shaft 12. The stub-shaft 16 is coupled by means of a flexible coupling 18 to a long telescopic or extensible shaft 19 which extends downwardly and to the right hand side, as viewed from the driving mechanism end of the truck, of the rotary table of the fabricating machine where it is connected by another flexible coupling 20 to the feeder mechanism 21, which it has to operate. The telescopic shaft 19, for example, may drive through any suitable connections such as a worm and worm wheel gearing, the cam shaft 21a which actuates the charge extruding plunger 21b and shear mechanism 21c of the mechanical feeder machine of the Hartford-Empire type, or the said shaft 19 may operate in well known manner a valve mechanism for controlling the supply of compressed air to pneumatic cylinders for operating the plunger and shears of a pneumatically operated feeder machine.

The main portion of the shaft 8 has keyed thereon at the inner end of the outside bearing bracket 9 a spur-pinion 22, engaging a spur gear 23 keyed on a short countershaft 24 journalled in a bracket 25 bolted to the base 1. The countershaft 24 carries at its other end fast thereon, a pinion 25a meshing with a gear 26 keyed on a hollow shaft 27 journalled in another bracket 28 bolted to the base 1. The hollow shaft has fixed at one end thereof a pointer 29. It is clear that the pointer 29 will rotate synchronously with the drive of the feeder machine. The velocity ratio of the gearing 22, 23, 25a, 26, and the setting of the pointer 29 may be such that the pointer will assume a definite position, for example, will point vertically upwards, at the instant the feeder machine delivers a mold charge.

Within the hollow shaft is journalled a spindle 30 which projects through the end thereof, and has fixed thereon a second pointer 31 located in a plane close to and parallel with the plane swept through by the pointer 29, the arrangement of the pointers resembling that of the hands of a clock. At its other end the spindle 30 has keyed thereon a gear 32 meshing with a pinion 33 fast on one end of a countershaft 34 journalled in a bracket 35, the other end of which countershaft has keyed thereon a gear 35a in mesh with a pinion 36 keyed on a shaft 8a, which is in alignment with the shaft 8, and which drives the rotary table 38a of the fabricating machine through bevel gears 37, 38 and other driving connections. The parts 32—36 are exact counterparts of the parts 22—26, and the pointer 31 moves in step with the fabricating machine operation similarly to the movement of the pointer 29 in step with the feeder machine operation. The pointer 31 may be set to point vertically upward at the instant that the charge receiving device of the fabricating machine lies under the feeding point. It is obvious that whenever the two pointers are coincident or in other predetermined relationship, the two machines will be in a condition to be coupled together in driving engagement.

The aligned shafts 8 and 8a carry respectively the halves or members 39, 40, of a friction clutch of known construction, the member 39 being keyed on the shaft 8, and the member 40 being feathered and capable of axial sliding on the shaft 8a.

The slidable coupling member 40 is connected in any convenient manner as by a link mechanism 40a with a boss 41 which has a collar 42 with a groove 43 in which engages the forked end 44 of a suitable actuating lever 45. In the example illustrated, the lever 45 is intended for manual operation by a rod 45a, but it could be operated by a pedal or by a solenoid arranged in an electrical circuit controlled by a push button, or off the feeder shaft by a cam.

The operation of the synchronizing and driving mechanism will be understood from the foregoing description. If the fabricating machine has been stopped to change molds, or for any other reason, the feeder machine meanwhile continuing to run because it is undesirable to disturb its operation, the operator in restarting the fabrication merely requires to close the clutch at the instant the two pointers are coincident. The machines will then be in the proper functional relationship with each other, and will run in step after closing the clutch. Particularly in the case of a large machine with moving parts of great inertia, by careful closing and opening of the clutch for brief periods, it is possible to bring the fabricating machine from rest gradually up to normal or nearly normal speed before finally closing the clutch at or about the instant of coincidence of the pointers, thereby avoiding any shock.

The use of a friction or other yielding clutch having its members capable of engaging in any relative angular position, in combination with the pointers, also makes it possible to vary the timing of the charge release in the feeder machine with respect to the instant the receiving mold 46 of the fabricating machine dwells under the feeding orifice 47, in the machine with intermittently rotating table shown in Figs. 1 and 2.

The invention may also be applied, however, to a fabricating machine with a continuously rotating table such as described in the specification of my U. S. patent application Serial No. 62,808, filed October 16, 1925. In such an application, if the two machines are to be run at a faster speed, it may be desired to drop the charge slightly before the receiving mold passes through the feeding point, which purpose can be accomplished merely by engaging the coupling slightly before the fabricating machine pointer 31 coincides with the feeder machine pointer 29. A scale may be provided preferably behind and fixed to one of the pointers, marked with suitable divisions, to enable the instant of clutch engagement to be more accurately determined when the same is to be accomplished in non-coincident relation of the pointers.

Another point to be noted is that the motor is positively geared to the slow speed, high torque, feeder machine camshaft, and drives through the clutch 39 the bevel pinion 37, which actuates the rotary table through reduction gearing of relatively large velocity ratio, the pinion 37 thus being a high speed, low torque member. Hence the engaging of the clutch couples the machines with minimum shock.

Figure 3:
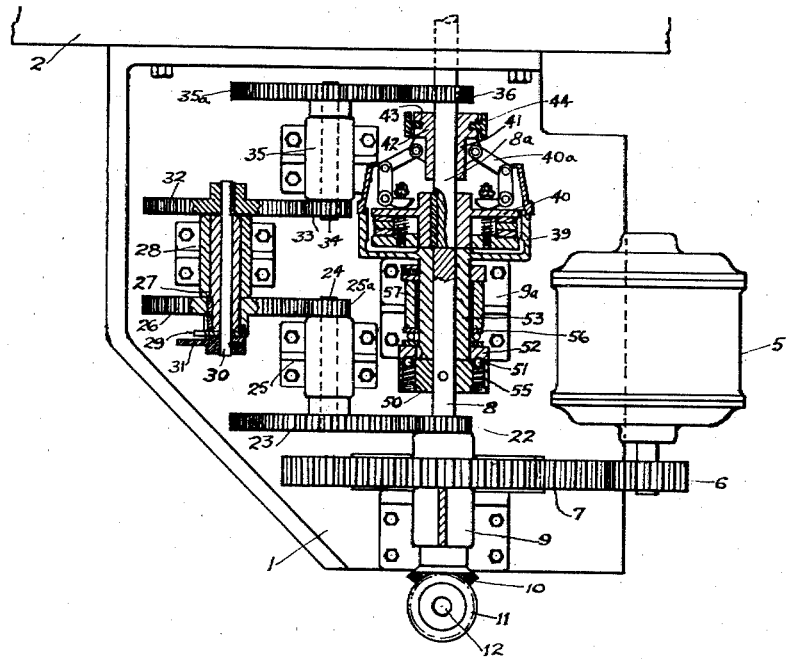
Fig. 3 is a plan view of the driving and synchronizing mechanism on a larger scale.
Figure 4:
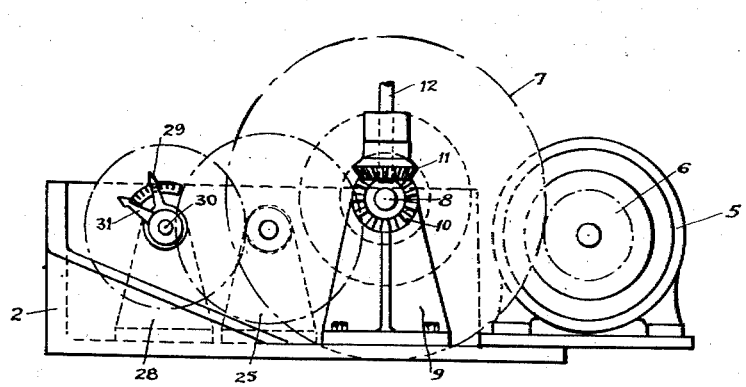
Fig. 4 is a diagrammatic elevation of Fig. 3.

Fig. 3 of the drawings shows a safety device arranged between the shaft 8 and the clutch member 39, said device comprising a collar 50 fast on the shaft 8, and housing spring pressed balls 51 which normally engage depressions in a collar 52 carried by an extension 53 of the clutch member 39. The springs 55 are adjustable by screws to exert such force that they hold the balls 51 in said depressions, thereby connecting the shaft 8 to the coupling 39, for all normal torques. If for any reason the fabricating machine should offer an excessive resistance, the springs 55 will yield, permitting the balls to ride out of the depressions in the collar 52, thereby disconnecting the fabricating machine from the drive and avoiding damage thereto or to the articles fabricated thereby. The arrangement of the balls and depressions is such that they can engage only in one definite position, so that when the cause of the disturbance is removed, the machines can re-engage without re-synchronizing. 56 is a thrust bearing between the collar 52 and the bushing 57 of the bearing bracket 9a.

I claim as my invention:

A glassware fabricating installation comprising in combination a base-plate, a machine for feeding glass charges, a machine for fabricating said charges mounted on the base plate, an auxiliary base-plate fixed to the machine base-plate, a motor driven shaft journalled in the auxiliary base-plate, connections for operating the feeder machine from said shaft, a shaft geared to the fabricating machine and journalled in said auxiliary base-plate, manually controllable clutch means for coupling and disengaging said shafts, a pointer geared to said first mentioned shaft, and a second pointer mounted adjacent to the first pointer and geared to the second mentioned shaft, the gearing ratios of the two pointers being similar.

In testimony whereof, I have hereunto subscribed my name, this 11th day of July 1929.

WILLIAM J. MILLER.